United States Patent
Komura et al.

(10) Patent No.: US 6,686,673 B1
(45) Date of Patent: Feb. 3, 2004

(54) BEARING STRUCTURES, SPINDLE MOTOR, AND HARD DISK DRIVE

(76) Inventors: Osamu Komura, Itami (JP); Makoto Otsuki, Itami (JP); Kaoru Murabe, Itami (JP)

(*) Notice: Subject to any disclaimer, the term of this patent is extended or adjusted under 35 U.S.C. 154(b) by 0 days.

(21) Appl. No.: 09/744,160
(22) PCT Filed: May 19, 2000
(86) PCT No.: PCT/JP00/03223
§ 371 (c)(1), (2), (4) Date: Mar. 15, 2001
(87) PCT Pub. No.: WO00/71903
PCT Pub. Date: Nov. 30, 2000

(30) Foreign Application Priority Data

| May 21, 1999 | (JP) | 11-141512 |
| Oct. 5, 1999 | (JP) | 11-284111 |
| Nov. 30, 1999 | (JP) | 11-339388 |

(51) Int. Cl.$^7$ .................. H02K 5/16
(52) U.S. Cl. .................. 310/90; 310/67 R
(58) Field of Search .................. 310/90.5, 90, 67 R (56) References Cited

U.S. PATENT DOCUMENTS

| 5,322,369 | A | * | 6/1994 | Kataoka et al. | 384/1 |
| 5,426,548 | A | * | 6/1995 | Fujii et al. | 360/98.08 |
| 6,069,429 | A | * | 5/2000 | Yamamoto et al. | 310/67 R |
| 6,181,039 | B1 | * | 1/2001 | Kennedy et al. | 310/90 |
| 6,242,831 | B1 | * | 6/2001 | Khan | 310/90 |
| 6,250,808 | B1 | * | 6/2001 | Ichiyama | 310/90 |
| 6,417,590 | B1 | * | 7/2002 | Komura et al. | 310/90.5 |

FOREIGN PATENT DOCUMENTS

| JP | 5-288214 | 11/1993 |
| JP | 5-347066 | 12/1993 |
| JP | 8-296649 | 11/1996 |
| JP | 9-144758 | 6/1997 |
| JP | 11-69725 | 3/1999 |

* cited by examiner

Primary Examiner—Dang Le (57) ABSTRACT

A hydrodynamic gas bearing structure and a hard disk drive (HDD) including a hydrodynamic gas bearing structure are provided in which electrostatic charge built up in the rotatable components is safely discharged to the fixed components. A conductive structure is installed between the rotatable and fixed components at or in the vicinity of the axis of rotation of the rotatable components. The conductive structure provides a safe discharge path for electrostatic charge dissipation. The conductive structure located at or in the vicinity of the axis of the rotation is barely influenced by the relative rotation between the rotatable and fixed components as well as air flow for generating hydrodynamic pressure. The conductive structure can be a magnetic fluid or a conductive, flexible strip. In a HDD a dummy disk and a dummy head are provided to dissipate electrostatic charge.

3 Claims, 9 Drawing Sheets

BEARING STRUCTURES, SPINDLE MOTOR, AND HARD DISK DRIVE

FIELD OF THE INVENTION

The present invention relates to bearing structures, spindle motors, and hard disk drives. More particularly, the present invention relates to bearing structures, spindle motors, and hard disk drives with measures against electrostatic problems.

BACKGROUND OF THE INVENTION

Figure 10:
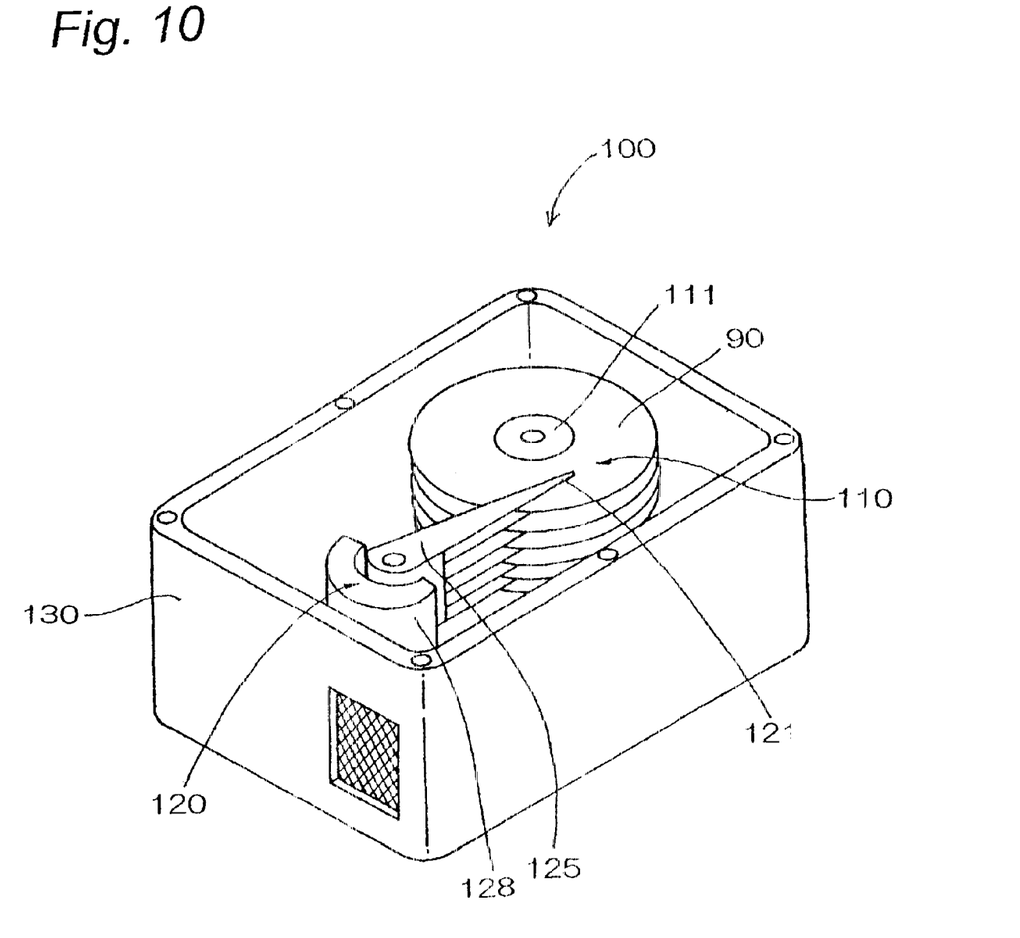
FIG. 10 is a perspective view showing the outline of an HDD.

One conventional hard disk drive (hereinafter referred to as a "HDD") is schematically indicated in FIG. 10. In the drawing, an HDD 100 is made of two major components; a disk section 110 and a head section 120 both being housed in a housing 130. The disk section 110 is made of a spindle motor 111 which rotates at high speed, and a plurality of storage media 90 having information storage surfaces and being mounted on a periphery of the spindle motor 111. The head section 120 is made of a plurality of head assemblies 121 which access the information storage surface of the storage media 90 rotating at a high-speed so as to record or replay necessary information, a carriage 125 which supports the head assemblies 121, and a head mount 128 which performs a pivot operation of the carriage 125 allowing the head assemblies 121 to access information on each storage media 90.

In response to recent needs for storage devices with smaller size, higher speed, and larger capacity, a hydrodynamic bearing tends to be used for a spindle motor 111 in place of a conventional ball bearing to implement a rotation with high speed of 10,000 rpm. or more with high accuracy. Especially, an attention has been directed to the use of a spindle motor with a hydrodynamic gas bearing which is free from heating during high-speed rotation and easy to be handled.

Figure 11:
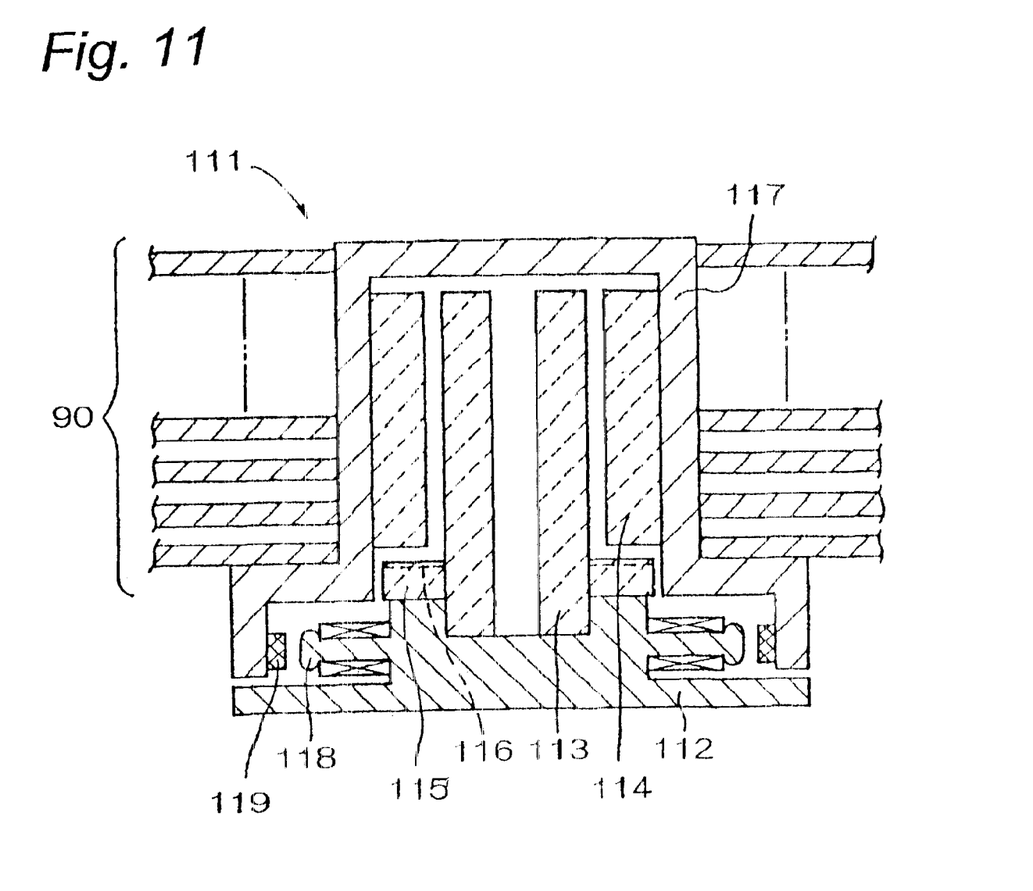
FIG. 11 is a cross sectional view showing a spindle motor having a hydrodynamic gas bearing according to the prior art.

FIG. 11 shows an example of the spindle motor 111 having a hydrodynamic gas bearing. In this drawing, a column like shaft 113 is fixed to a base 112, and a hollow cylinder-shaped sleeve 114 is fitted to the outer peripheral surface of the shaft 113 leaving a certain clearance therebetween. The outer peripheral surface of the shaft 113 and the inner peripheral surface of the sleeve 114 constitute a radial bearing section. Opposed to one end face of the sleeve 114 in an axial direction, a disk-shaped thrust plate 115 is attached to the base 112 perpendicular to the axis of the shaft 113. On the surface of the thrust plate 115 opposed to one end face of the sleeve 114, there is provided a groove 116 as shown in a dotted line for generating a thrust hydrodynamic pressure. The end surface of the sleeve 114 and the thrust plate 115 constitute a thrust bearing section The radial bearing section and the thrust bearing section constitute the hydrodynamic gas bearing, and a gas (normally the air) present between the components of each bearing section generates a hydrodynamic pressure by relative rotating movements of the components. A rotor hub 117 is fixed to the sleeve 114, and a plurality of storage media 90 are mounted on the outer peripheral surface of the rotor hub 117. Attached also to the base 112 is a radially-disposed stator 118, which is wound with a coil. On the inner peripheral surface of the rotor hub 117, there is mounted a rotor magnet 119, which is faced with the stator 118.

In operation of spindle motor 111 so constructed, an electric current supplied to the coil wound around the stator 118 induces repellent/attraction forces between the stator 118 and the rotor magnet 119. This produces a rotational driving force of the rotor hub 117, which drives the sleeve 114 fixed to the rotor hub 117 to rotate about the shaft 113. This rotation generates hydrodynamic pressure in a radial direction at the radial bearing section, and this keeps the shaft 113 and the sleeve 114 out of contact with each other. On the other hand, in the thrust bearing section, the relative rotation between the end face of the sleeve 114 and the thrust plate 115 generates a hydrodynamic pressure in a thrust direction by the effect of the groove 116. As a result, the sleeve 114 is lifted up from the thrust plate 115, which makes the sleeve 114, the rotor hub 117, the storage media 90, and other rotatable components out of contact with the shaft 113, the thrust plate 115, and other fixed components, thereby enabling a high-speed rotation.

As described above, the use of a hydrodynamic gas bearing provides the spindle motor 111 with stable and high-speed rotation. The high-speed rotation in a non-contact state, however, has problems, For example, the high-speed rotation causes an air friction, which generates an electrostatic charge in the rotatable components. The electrostatic charge is accumulated in the rotatable components since they are isolated from the fixed components. The bearing section with the ball bearing allows the electrostatic charge to flow into the fixed components being in contact with the ball bearing, which causes no problems. On the other hand, since the rotatable components of the hydrodynamic bearing are out of contact with the fixed components, the electrostatic charge generated in the rotatable components is prevented from leaking to the fixed components.

The electrostatic charge, if it is accumulated to a certain extent, can cause an electrostatic discharge between, for example, the disc section 110 and the head section 120 of the HDD (see FIG. 10). This may in turn damage the head assemblies 121, the storage media 90, and other HDD components. The same problem can occur in other bearings such as magnetic and hydrostatic gas bearings in which the rotatable components are rotated without any contact with the fixed components.

In the hydrodynamic gas bearing, no hydrodynamic pressure is generated as long as the spindle motor is de-energized and then the rotatable components are maintained in contact with the fixed components. Therefore, the bearing member made of conductive material such as stainless steel allows the accumulated electrostatic charge to be discharged by the contacts with the components during the halts of the spindle motor. This means that a relatively short on/off driving of the spindle motor can prevent the accumulation of the electrostatic charge in the rotatable components. A relatively long time rotation without any contacts between the rotatable and fixed components accumulates a great amount of electrostatic charge, which may damage the HDD components.

The bearing components may be made of ceramics having an enhanced abrasion resistance to prevent abrasion and seizing thereof. Typically, the ceramic bearing member is insulative. Therefore, the bearing member made of ceramics disables the electrostatic charge from being discharged even by the contact of the bearing members during the halt of the spindle motor.

Figure 12:
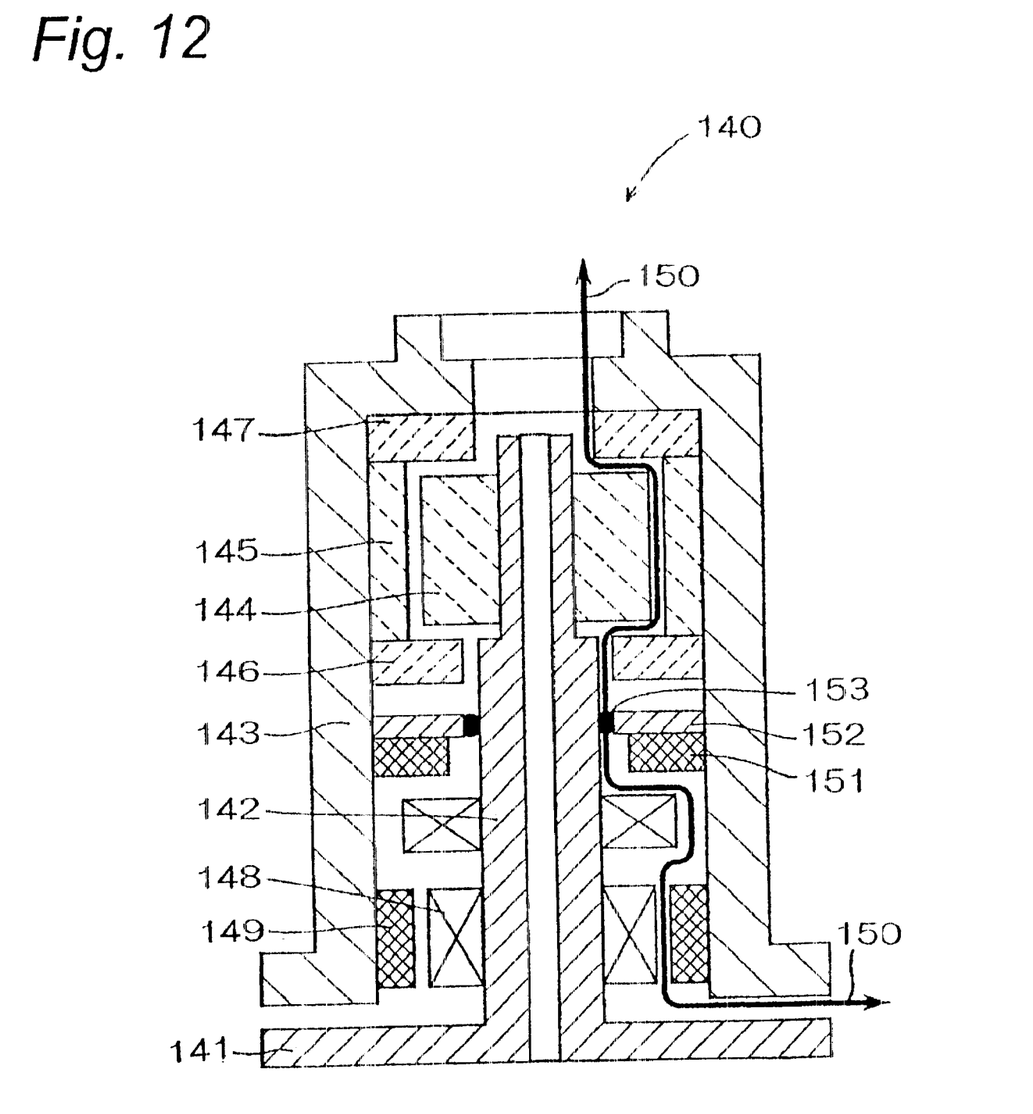
FIG. 12 is a cross sectional view showing a hydrodynamic gas pressure bearing having a structure to conduct electrostatic charge according to the prior art.

Japanese Patent Laid-Open Publication (A) No. 55916/1999 discloses a spindle motor having means for overcoming such problem. FIG. 12 schematically illustrates the spindle motor 140. In the drawing, a base 141 supports a shaft 142 onto which a rotor hub 143 is fitted. On an outer peripheral surface of the rotor hub 143, a hard disk, not illustrated, is to be mounted. A radial bearing component 144 is attached to the shaft 142, and a radial bearing component 145 is attached to the rotor hub 143. The radial bearing component 144 and the radial bearing component 145 are faced with each other leaving a specified clearance therebetween in such a manner as to enable relative rotation thereof. Attached to both axial ends of the rotatable radial bearing component 145 are a pair of thrust bearing components 146 and 147 so that the components face with the bottom face and the top face of the fixed radial bearing component 144, respectively, leaving a specified clearance. The shaft 142, which is equipped with a stator 148 wound with a coil, is faced with a rotor magnet 149 attached to the rotor hub 143 for driving the spindle motor.

In operation of the spindle motor 140 so constructed, an electric current supplied to the coil of the stator 148 produces a rotational driving force between the stator 148 and the rotor magnet 149, which in turn rotates the rotor hub 143 equipped with the rotor magnet 149 about the shaft 142. As a result, the rotatable radial bearing component 145 attached to the rotor hub 143 rotates, thereby generating a radial hydrodynamic pressure between the rotatable radial bearing component 145 and the fixed radial bearing component 144 confronted therewith. At the same time, a thrust hydrodynamic pressure is generated between the rotatable thrust bearing component 146 and the bottom face of the fixed radial bearing component 144 confronted therewith, and between the rotatable thrust bearing component 147 and the top face of the fixed radial bearing component 144 confronted therewith. Consequently, the rotor hub 143 and the rotatable components fixed thereto rotate in non-contact state with the shaft 142 and other fixed components.

In order to discharge the electrostatic charge built up in the rotatable components which rotate in a non-contact state, the spindle motor 140 disclosed in the Japanese Patent Laid-Open Publication (A) No. 55916/1999 has the structure shown below. A ring-shaped magnet 151 and a magnetic plate 152, which are in contact with each other, are attached to the rotor hub 143. Between the magnetic plate 152 and the shaft 142, there is provided a slight gap, and the gap is filled with a magnetic fluid 153. The electrostatic charge generated at the rotatable components are discharged into the fixed components through the magnetic fluid 153.

However, the structure disclosed in Japanese Patent Laid-Open Publication (A) No. 55916/1999 has some problems. For generating hydrodynamic pressure in this bearing structure, a gas should extend between the radial bearing components 144 and 145, between the thrust bearing components 144 and 146, and between the thrust bearing components 144 and 147. In the structure as shown in FIG. 12, an opening to feed/discharge the gas is, as shown with an arrow 150 in the drawing, provided only at the upper end or the lower end of the spindle motor. Consequently, as is clear from the drawing, the gas flow for generating the hydrodynamic pressure passes through a sealing layer sealed by the magnetic fluid 153. Depending on the specifications and working conditions of a bearing, as well as the properties of a sealing component to be used, the incoming gas flow may break the magnetic sealing layer, and the high-speed rotation of the rotor hub 143 may splash the magnetic fluid 153. Once the magnetic fluid 153 is splashed, the rotatable components are no longer in contact with the fixed components, as a consequence of which the electrostatic charge may build up in the rotatable components, leading to possible damages on the HDD.

Another problem is increased power consumption. When the peripheral speed of the rotatable components sealed by the magnetic fluid 153 becomes higher to a certain extent, the magnetic fluid 153 filling the gap between the fixed components and the rotatable components develops a large viscous resistance. This increases the rotational driving torque and consequently increases the power consumption. In addition, an increase of the viscous resistance causes generation of heat, which increases the temperature of the whole HDD.

When ceramics, which are generally nonconductive and have high abrasion resistance, are used at the bearing sections, it is impossible to discharge electrostatic charge built up in the rotatable components even if the bearing components are in a contact state at the time the spindle motor stops. As a result, damages on the HDD may occur by the accumulation of electrostatic charge, which may lead to forced replacement of ceramics with conductive materials such as a stainless steel, even though ceramics have good abrasion resistance as bearing components.

SUMMARY OF THE INVENTION

The object of the present invention is to solve the problems stated above. More particularly, it is an object of the present invention to provide bearing structures, spindle motors, and HDDs having a structure for reliably discharging electrostatic charge built up at rotatable components during rotation to fixed components even they rotate in non-contact state. It is another object of the present invention to provide a bearing structure which is capable of conducting electrostatic charge when it comes to contact state at the time rotation stops, while keeping excellent abrasion resistance and rigidity.

One aspect of the present invention relates to a bearing structure, comprising: fixed components; and rotatable components which are supported by the fixed components for rotation, wherein the fixed components and the rotatable components are kept out of contact with each other during rotations of the rotatable components, and the bearing structure further comprising a conductive structure for electrically connecting the fixed components and the rotatable components is provided on or in the vicinity of an axis of the rotational center of the bearing structure.

Another aspect of the present invention relates to a bearing structure, wherein the conductive structure comprises magnetic fluid.

Yet another aspect of the present invention relates to a bearing structure, wherein the conductive structure is an elastic component which is fixed to one of either the fixed components or the rotatable components and in contact with the other thereof.

Yet another aspect of the present invention relates to a bearing structure, wherein the elastic component is a curved flexible conductive strip.

Yet another aspect of the present invention relates to a bearing structure, wherein the elastic component is a flexible conductive ring.

Yet another aspect of the present invention relates to a bearing structure, wherein the conductive structure comprises a conductive headed pin, which is fitted into a blind hole provided on the one of either the fixed components or the rotatable components in a movable manner in an axial direction, and pushed by a elastic body so that a spherical head thereof serving as a contact point is kept in contact with the other thereof.

Yet another aspect of the present invention relates to a bearing structure having the conductive structure, wherein the elastic body is a coil spring made of conductive materials.

Yet another aspect of the present invention relates to a bearing structure, wherein the conductive structure comprises a bundle of conductive fibers, one end of which is bundled and fixed to the rotatable components, and the other end of which is a free end which is inserted into a hole provided on the fixed components.

Yet another aspect of the present invention relates to a bearing structure, wherein the conductive structure comprises: a spindle which is fitted into and guided by a sleeve fixed to one of either the fixed components or the rotatable components in a manner capable of relative rotation, which spindle has a groove or grooves on an outer peripheral surface thereof for generating hydrodynamic pressure to generate thrust force for pushing a spherical contact point at one end of the spindle into the sleeve by the effect of the relative rotation; and a strand composed of conductive fibers, one end of which is fixed to the other of either the fixed components or the rotatable components and the other end of which is fixed to an end opposed to the spherical contact point of the spindle with having sagging.

Yet another aspect of the present invention relates to a bearing structure, wherein the conductive fibers are composed of any one of boron, carbon monofilaments, or tungsten, or a combination thereof.

Yet another aspect of the present invention relates to a bearing structure, wherein means for supporting the rotatable components in non-contact slate against the fixed components is a hydrodynamic gas bearing.

Yet another aspect of the present invention relates to a bearing structure, wherein one or more bearing components constituting a radial bearing section and a thrust bearing section of the hydrodynamic gas bearing are made of ceramics.

Yet another aspect of the present invention relates to a bearing structure having a hydrodynamic gas bearing, comprising: fixed components; and rotatable components which are supported by the fixed components for rotation, wherein the fixed components and the rotatable components are kept in non-contact state during rotation of the rotatable components, and wherein among bearing components constituting a radial bearing section and a thrust bearing section of the hydrodynamic gas bearing, at least a pair of bearing components coming into contact with each other when rotation stops is made of conductive ceramics.

Yet another aspect of the present invention relates to a bearing structure, wherein the conductive ceramics are made of $Al_2O_3$-30 vol. % TiC, $TiB_2$, or $Si_3N_4$-30 vol. % TiN.

Yet another aspect of the present invention relates to a bearing structure having a hydrodynamic gas bearing, comprising: fixed components; and rotatable components which are supported by the fixed components for rotation, wherein the fixed components and the rotatable components are kept in non-contact state during rotation of the rotatable components, characterized in that there is provided a conductive structure comprising a magnetic fluid for electrically connecting the fixed components and the rotatable components either in the region where there is no air flow generated by suction or discharge of a gas for generating hydrodynamic pressure at the hydrodynamic gas bearing potion, or in the region where the air flow is negligible.

Still another aspect of the present invention relates to a spindle motor having the bearing structure according to any one of aspects stated above.

Still another aspect of the present invention relates to a hard disk drive having the spindle motor stated above.

Still another aspect of the present invention relates to a HDD, comprising: a plurality of storage media which enable recording or replaying information, or both thereof; a spindle motor which rotates a plurality of the storage media mounted thereon; and a plurality of head assemblies each of which access each information storage surface of a plurality of the storage media, and perform recording or replaying information, or both thereof in non-contact state with the rotating information media, wherein there is provided a discharge induction structure for inducing discharge of electrostatic charge between a dummy disk specified among a plurality of the storage media and a dummy head specified among a plurality of head assemblies.

Yet another aspect of the present invention relates to a HDD, wherein the discharge induction structure is so structured that a gap between the dummy head and the dummy disk is smaller than a gap between other storage media and other head assemblies accessing thereto during operation in a non-contact state.

Yet another aspect of the present invention relates to a HDD, wherein a gap between the dummy head and the dummy disk is about a half of or less than a half of a gap between other storage media and other head assemblies accessing thereto.

Yet another aspect of the present invention relates to a HDD, wherein a gap between the dummy head and the dummy disk is 15 nm or less.

Yet another aspect of the present invention relates to a HDD, wherein the discharge induction structure is so structured that conductivity of the dummy disk is higher than conductivity of other storage media.

Yet another aspect of the present invention relates to a HDD, wherein the discharge induction structure is so structured that conductivity of at least either one of the dummy head or a carriage supporting the dummy head is higher than conductivity of other head assemblies or other carriages, respectively.

Yet another aspect of the present invention relates to any one of the HDD stated above, wherein the spindle motor for driving the storage media has a hydrodynamic gas bearing.

Yet another aspect of the present invention relates to a HDD, wherein one or more bearing components constituting a radial bearing section and a thrust bearing section of the hydrodynamic gas bearing are made of ceramics.

Still another aspect of the present invention relates to a method for avoiding damages caused by electrostatic charge in a hard disk drive having a plurality of head assemblies each of which accesses each of the plurality of rotating storage media for performing recording or replaying information, or both thereof between the head assemblies and the storage media, comprising the step of inducing an electrostatic charge built up in either one of the head assemblies or the storage media to be discharged to the other thereof between a storage medium specified among a plurality of the storage media and a head assembly specified among a plurality of the head assemblies, so as to eliminate damages attributed to discharge of electrostatic charge from other components composing the hard disk drive.

In the bearing structure having a conductive structure using a magnetic fluid according to the present invention, the gas flow passing through the bearing, and a relative rotation at a place of the magnetic fluid disposed are almost negligible. This prevents the air flow from splashing or scattering the magnetic fluid present between the rotatable components and the fixed components, depresses increase of viscous resistance of the magnetic fluid or generation of heat thereof in a high-speed rotation region, and realizes stable discharge of electrostatic charge built up in the rotatable components to the fixed components.

According to the hydrodynamic gas bearing using conductive ceramics materials, high rigidity and good abrasion resistance that ceramics has can be fully utilized for the bearing components, and on the top of that, the electrostatic charge built up in the rotatable components can be safely discharged to the fixed components when the rotatable components come into contact with the fixed components when rotation stops.

According to the hydrodynamic bearing structure in accordance with the present invention, in which a structure for enabling conduction of electrostatic charge is disposed between the rotatable components and the fixed components of the bearing sections, power consumption is constrained. Further, abrasion of a contact point, displacement of a abrasion spot due to scattering abrasion powders, and generation of unnecessary frictional heat are prevented without rotational torque increase stems form contact between conductive materials In addition, the contact between the conductive materials does not hinder lifting up of the rotor hub by the effect of a hydrodynamic pressure groove of a thrust hydrodynamic bearing, nor induce misalignment of the center attributed to conductive materials when assembling the rotatable components and fixed components.

By implementing the HDD having a dummy disk and a dummy head according to the present invention, discharge of electrostatic charge accumulated at the rotatable components of a spindle motor will be induced in between the dummy disk and the dummy head of the present invention, which prevents occurring discharge at other head assemblies of the HDD, resulting in prevention of damages on these regular head assemblies, thereby securing high reliability of the HDD.

DETAILED DESCRIPTION OF THE PREFERRED EMBODIMENTS

Figure 1:
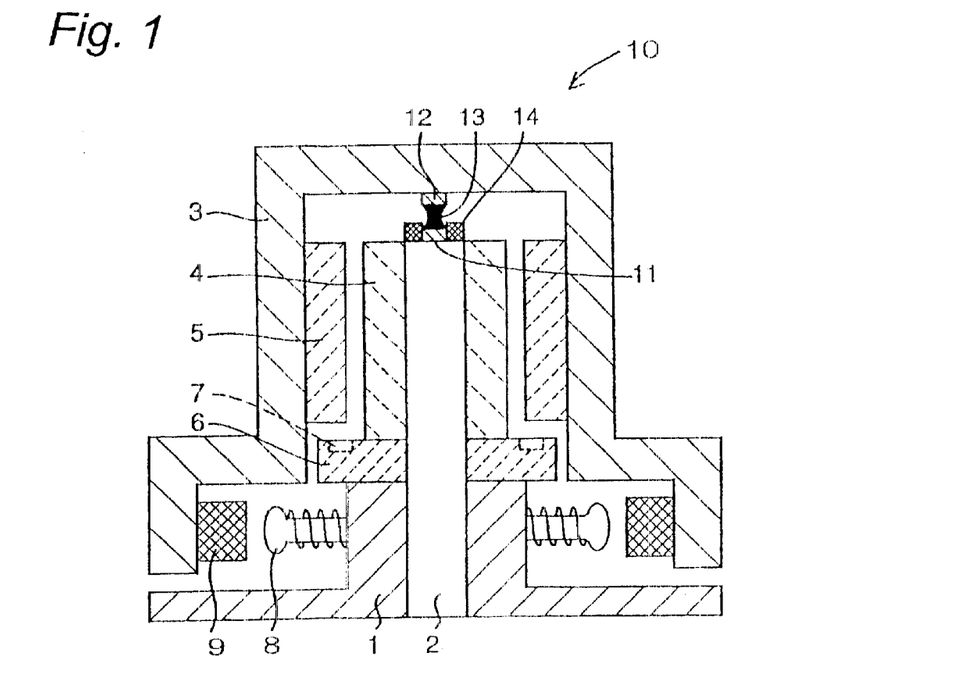
FIG. 1 is a cross sectional view showing a bearing structure of an embodiment of the present invention.

Now the first embodiment of the present invention will be described with reference to the associated drawing. FIG. 1 illustrates a spindle motor 10 and a hydrodynamic gas bearing used therein according to this embodiment. In the drawing, a shaft 2 is fixed to a base 1, and a rotor hub 3 which rotates about the shaft 2 is fitted on the outer peripheral surface of the shaft 2. A radial bearing is component 4 is attached to the outer peripheral surface of the shaft 2, while a rotatable radial bearing component 5 is attached to the inner peripheral surface of the rotor hub 3. The fixed radial bearing component 4 and the rotatable radial bearing component 5 are faced with each other by having specific clearance in a radius direction, and constitute a radial bearing section of the hydrodynamic gas bearing. A disk-shaped thrust plate 6 is also attached to the base 1 perpendicular to the axis of the shaft 2 and opposed to one end face of the rotatable radial bearing component 5 in an axial direction. The thrust plate 6 is equipped with a groove 7 as shown by a dotted line for generating thrust hydrodynamic pressure. The end face of the radial bearing component 5 and the thrust plate 6 constitute a thrust bearing section of the hydrodynamic gas bearing.

Fixed also to the base 1 is a radially-disposed stator 8, which is wound with a coil. On the inner peripheral surface of the rotor hub 3, there is mounted a rotor magnet 9, which is faced with the stator 8. On the outer peripheral surface of the rotor hub 3, a plurality of storage media, not illustrated, are to be mounted.

On the upper face of the shaft 2 in the drawing, there is mounted a yoke 11 in the center portion. A yoke 12 is attached to the rotor hub 3 at a position opposed to the yoke 11. Both of the yokes 11 and 12 faces each other by having a specified gap. The gap between the yokes 11 and 12 is filled with a magnetic fluid 13. A ring-shaped magnet 14 is fixed to the outer peripheral surface of the yoke 11 mounted on the upper face of the shaft 2. The magnetic fluid 13 is retained in a gap between the yoke 11 and the yoke 12 by the effect of the magnet 14.

In the operation of the spindle motor 10 so structured, electric current supplied to the coil wound around the stator 8 induces repellent/attraction forces between the stator 8 and the rotor magnet 9, which rotates the rotor magnet 9 and the rotor hub 3 fixed to the rotor magnet 9 about the shaft 2. This rotation generates hydrodynamic pressure between the radial bearing components 4 and 5 positioned between the shaft 2 and the rotor hub 3, which keeps both the radial bearing components 4 and 5 in a non-contact state in a radial direction. In the thrust bearing section between the thrust plate 6 and the one end face of the radial bearing component 5, a relative rotation between the thrust plate 6 and the radial bearing component 5 generates thrust hydrodynamic pressure by the effect of the hydrodynamic pressure generating groove 7. As a result, the rotor hub 3 and other rotatable components bring into out of contact with the shaft 2 and other fixed components, enabling a high-speed rotation.

During rotation of the rotor hub 3, the relative movement between the shaft 2 and the rotor hub 3 at the position where the magnetic fluid is filled is substantially close to zero, since the position is located on the rotational center of the bearing. In addition, the rotation of the rotor hub 3 is born by the hydrodynamic gas bearing as described above, no air flow is generated at the portion where the magnetic fluid 13 is filled. Accordingly, the magnetic fluid 13 between the shaft 2 and the rotor hub 3 may maintain a stable contact with these two components. As a result, the electrostatic charge generated by high-speed rotation at the rotatable components can be discharged to the shaft 2 through the magnetic fluid 13 even during rotation of the rotor hub 3. In addition, since the magnetic fluid 13 is barely influenced by relative movement as described above, an increase of viscous resistance and generation of heat during high-speed rotation are avoided.

Regarding to materials of each component described above, the shaft 2 and rotor hub 3 are, for example, made of conductive materials such as stainless steal so as to enable discharge of electrostatic charge. On the other hand, the bearing components 4, 5, and 6 composing the radial bearing section and the thrust bearing section, which do not have to stay in contact with each other for discharging electrostatic charge when spindle motor stops, can be, for example, made of ceramics such as alumina having desirable properties as bearing components which has high abrasion resistance and rigidity, and therefore, increases durability and reliability of the spindle motor.

Figure 2:
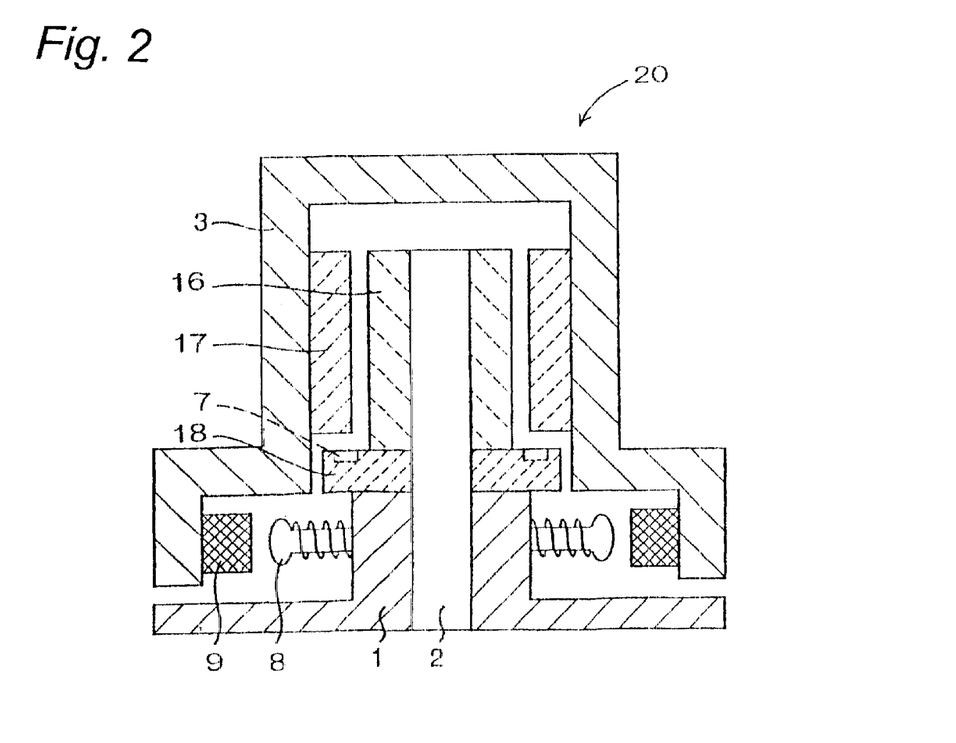
FIG. 2 is a cross sectional view showing a bearing structure of another embodiment of the present invention.

Now the second embodiment of the present invention will be described with reference to the associated drawing. FIG. 2 shows a cross section of a spindle motor 20 and a hydrodynamic gas bearing used therein in the present embodiment. In FIG. 2 and following other drawings for the other embodiments, like elements described before bear like reference numerals. In FIG. 2, a fixed radial bearing component 16 is attached to the shaft 2 and is faced with a rotatable radial bearing component 17 which is attached to the rotor hub 3 leaving a specific clearance therebetween. A thrust plate 18 mounted on the base 1 is disposed in such a manner as a surface thereof provided with a groove 7 for generating hydrodynamic pressure is faced with one end face of the rotatable radial bearing component 17. The bearing components 16, 17, and 18 of this embodiment are made of conductive ceramics. Other structures are similar to those in the previously described embodiment except that the magnetic fluid 13 and its retaining structure comprising the yoke 11, the yoke 12, and the magnet 14 are not provided.

In this embodiment, ceramics having desirable properties for a bearing component such as high abrasion resistance and rigidity are used as materials for the hydrodynamic bearing components. When the spindle motor stops, these bearing components come into contact with each other, enabling the discharge of electrostatic charge built up in the rotatable components to contacted fixed components. To implement discharge of electrostatic charge, the bearing components 16, 17, and 18 are made of conductive ceramics. Specifically, these bearing components are made from ceramics having conductivity as well as high abrasion resistance, such as $Al_2O_3$-30 vol. % TiC, $TiB_2$, or $Si_3N_4$-30 vol. % TiN or others.

In contrast with the previous embodiment which is configured to enable constant discharge of electrostatic charge even during rotation, the present embodiment is provided with a means for discharging built up electrostatic charge only when the spindle motor stops. The bearing components typically made of stainless steel are configured to be made of ceramics, in this embodiment, with high abrasion resistance and rigidity to increase durability of the spindle motor, and to enable discharge of electrostatic charge built up in the rotatable components as with the case of stainless steel when the spindle motor stops and the bearing components come into contact. Such configuration is applicable to a spindle motors which is operated intermittently for a relatively short period of time. It will be understood that the structure offering constant discharge as disclosed in the first embodiment or other embodiments described later may be added to this embodiment as needed. When the conductive ceramics is used, it is also possible to form the fixed radial bearing component 16 and the shaft 2 as an integrated component made of ceramics.

In this embodiment, all the bearing components 16, 17, and 18 are configured to be made of conductive ceramics. It will be understood, however, that a certain conductivity is required for the rotatable components and the fixed components which are designed to come into contact when the spindle motor stops. For example, if the bearing sections are structured so that the rotatable radial bearing 17 and the thrust plate 18 come into contact with each other when the spindle motor stops, the components 17 and 18 are required to be made of conductive ceramics, but the fixed radial bearing component 16 is not necessarily made of a conductive material.

Figure 3:
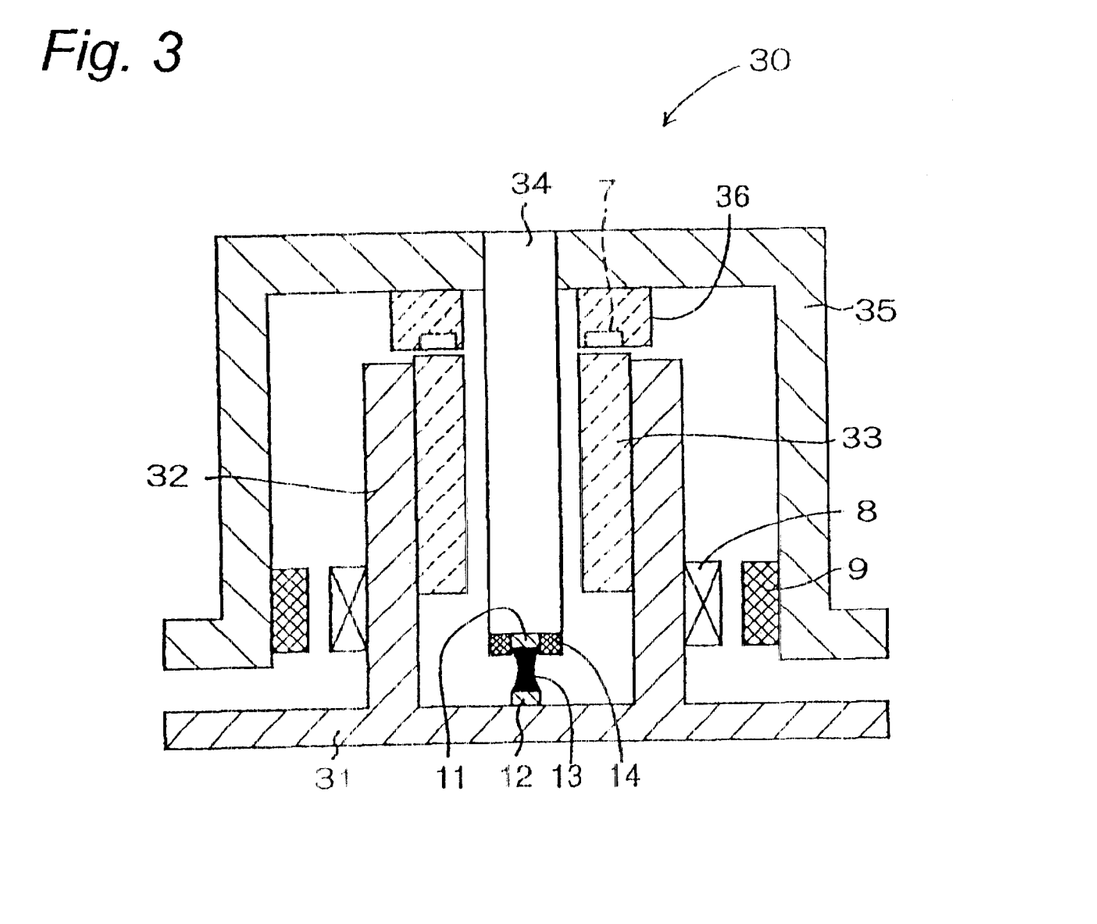
FIG. 3 is a cross sectional view showing a bearing structure of still another embodiment of the present in invention.

Now the third embodiment of a spindle motor and a hydrodynamic gas bearing used therein according to the present invention will be described with reference to the associated drawing. FIG. 3 shows a spindle motor 30 and a hydrodynamic gas bearing of this embodiment. The spindle motor of this embodiment has a bearing structure in which a shaft is rotated and a fixed sleeve bears the shaft.

In this drawing, a hollow cylinder-shaped sleeve 32 is fixed to a base 31, and a fixed radial bearing component 33 is attached to the inside of the sleeve. A column like shaft 34 is inserted into the interior of the hollow of the radial bearing component 33 in a rotatable manner. The shaft 34 is equipped with a rotor hub 35. The components 34 and 35 forms rotatable components. The shaft 34 is conductive and preferably made of conductive ceramics. An alternative structure is to insert the shaft 34 into a conductive ceramics sleeve in a manner that the sleeve is faced with the fixed radial bearing component 33. On the inner portion of the upper face of the rotor hub 35, there is attached a thrust plate 36. On the lower face of the thrust plate 36, there is provided a groove 7 for generating a hydrodynamic pressure as shown by dotted line, which faces one end face of the fixed radial bearing component 33 in an axial direction. Between the lower face, in this drawing, of the shaft 34 and the upper face of the base 21 confronting thereto, there is given a structure providing the magnetic fluid 13 as with the first embodiment. The magnetic fluid 13 is retained between the yoke 11 and yoke 12 by the effect of the magnet 14.

In the operation of the spindle motor as structured above, a rotational driving force generated between the stator a and the rotor magnet 9 rotates rotatable components comprising rotor hub 35 and the shaft 34. This rotation generates radial hydrodynamic pressure between the shaft 34 and the radial bearing component 33, as well as thrust hydrodynamic pressure between the end face of the radial bearing component 33 and the thrust plate 36 by the effect of the groove 7. As a result, the rotatable components rotate in non-contact state with the fixed components including the radial bearing component 33 and the sleeve 32. An electrostatic charge generated by this rotation at the rotatable components is constantly discharged to the fixed components through the magnetic fluid 13 present between the lower face of the shaft 34 and the base 21. Since the magnetic fluid 13 is located in almost the rotational center of the hydrodynamic bearing, the magnetic fluid 13 is barely influenced by relative high-speed rotation of contacted components. In addition, there is no gas flow for generating hydrodynamic pressure in the vicinity of the magnetic fluid 13. The magnetic fluid 13 is, therefore, stably kept in its place, which contributes to eliminate increase of viscous resistance and generation of heat.

It will be appreciated, though not illustrated, that a conductive structure using the magnetic fluid may be positioned not in the center of the lower face of the shaft 34 or the central axis of rotation, but may be positioned on the outer peripheral surface of the lower portion, in this drawing, of the shaft 34. More particularly, the sleeve 32 is provided with a doughnut-shaped component, in the hollow of which the shaft 34 is fitted. A gap between the doughnut-shaped component and the shaft 34 is filled with a magnetic fluid to form a electrostatic charge conductive structure. In this case, the rotation speed of the shaft 34 has a certain influence on the magnetic fluid. However, since the magnetic fluid is located on the outer periphery of the shaft 34 which is close to the center the rotation, peripheral speed at that location is not so high. Also, there is no air flow near the magnetic fluid. Accordingly, the problems including increase of viscous resistance, generation of heat, and dispersion of magnetic fluid is considerably mitigated compared to the hydrodynamic pressure structure depicted in the prior art as shown in FIG. 12. Under certain conditions, this structure can sufficiently function as a structure of discharging built up electrostatic charge. For the HDD or the spindle motor specified for the use of intermittent operation, the radial bearing component 33 and the thrust plate 36 may be made of conductive ceramics as disclosed in the second embodiment, and electrostatic charge may be discharged, without using the magnetic fluid 13, between the components 33 and 36 when the spindle motor stops.

Figure 4A:
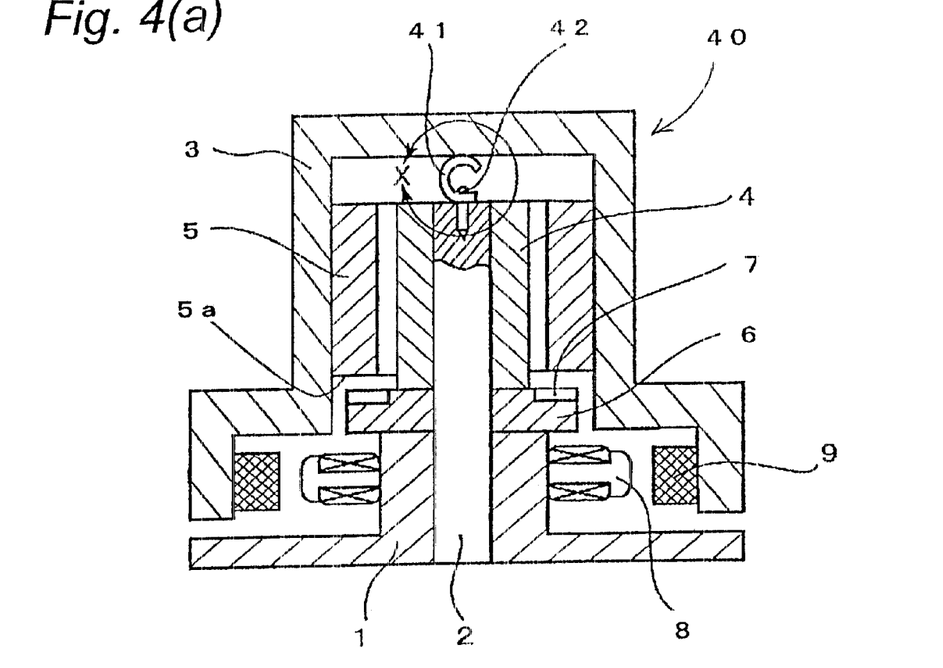
FIGS. 4(a) and 4(b) are a cross sectional view showing a bearing structure of still another embodiment of the present invention.
Figure 4B:
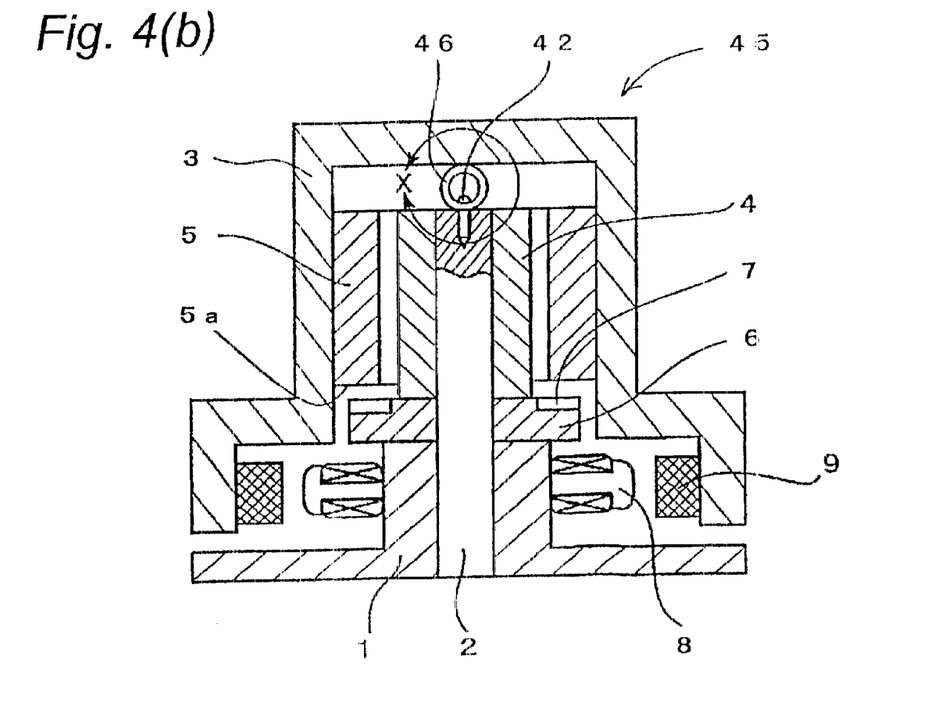

Now the fourth embodiment of a spindle motor according to the present invention will be described with reference to the associated drawing. FIG. 4 depicts spindle motors 40 and 45 according to the present embodiment. In this embodiment, the magnetic fluid used in the embodiment shown in FIG. 1 is replaced with a conductive component, through which electrostatic charge is discharged. More particularly, a curved flexible strip 41 composed of a conductive material shown in FIG. 4A, or a ring 46 composed of a conductive material shown in FIG. 4B is attached to a shaft 2 by a rivet 42 and the upper portions of the strip 41 or the ring 46 is kept in contact with the inside of the upper face of a rotor hub 3. This structure can discharge electrostatic charge stored in the rotor hub 3 through the strip 41 or the ring 46 and the rivet 42 to the shaft 2, whether the spindle motor is rotating or not.

The strip 41 or the ring 46 is made of a thin spring steel flat plate, and an installation load thereof is preferably set to lighter than the load of the overall rotatable components including storage media. The spring constant of the strip 41 or the ring 46 may be set at low level for assisting lift up of the rotatable components when starting rotation during which the lower face 5a and the thrust plate 6 contact with each other. If the spring constant of the strip 41 or the ring 46 is set at the level of installation load which is equal to the total weight of all the rotatable components, the strip 41 or the ring 46 may keep the lower face 5a of the radial bearing component 5 and the thrust plate 6 in non-contact state, even when spindle motor stops. This enables avoidance of the torque loss due to the frictional resistance between the lower face 5a of the radial bearing component 5 and the thrust plate 6 when starting rotation.

Further, by adjusting a contact point of the conductive strip 41 or the ring 46 to be located in almost the rotational center of the rotor hub 3, concerns for torque loss, friction, and heat generation can also be eliminated. In assembling the spindle motor, as the strip 41 or the ring 46 is only in contact with the inner wall of the rotor hub 3, there is no concern for causing displacement of the rotational center between the rotatable components and the fixed components.

Although the shaft 2 is configured to be a fixed component in FIG. 4, the structure of this embodiment is also applicable to the case where the shaft is a rotatable component such as shown in FIG. 3. In addition, the strip 41 or the ring 46 may be attached to either one of the fixed components or the rotatable components, and be arranged to contact the other.

Figure 5A:
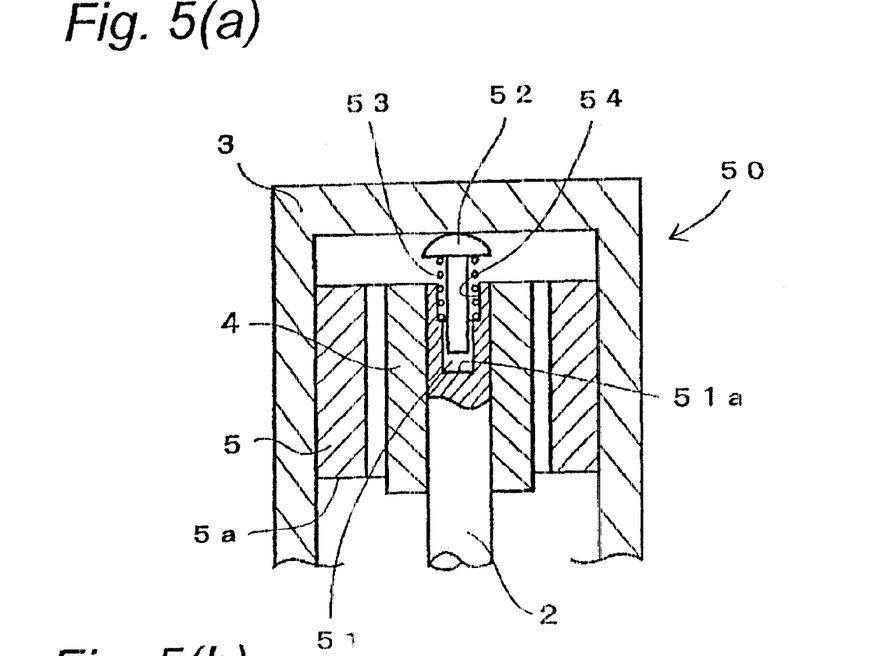
FIGS. 5(a) and 5(b) are a fragmentary cross sectional view showing a bearing structure of still another embodiment of the present invention.
Figure 5B:
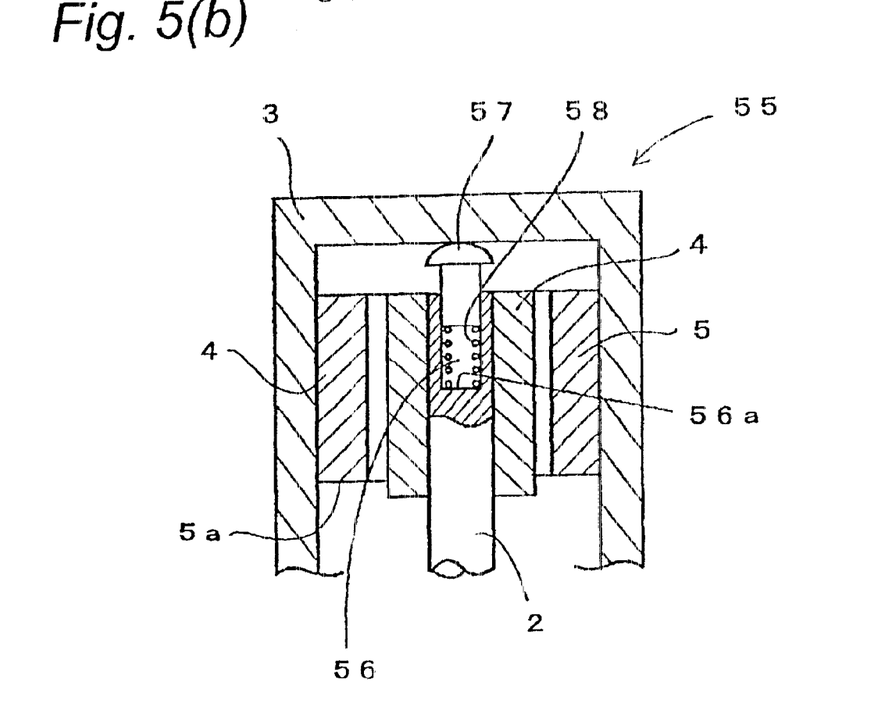

Now the fifth embodiment of the spindle motor according to the present invention will be described with reference to the associated drawing. FIG. 5 illustrates spindle motors 50 and 55 according to the present embodiment. These drawings illustrate a vicinity of the electrostatic charge conductive portion indicated by X in FIG. 4. Other portions may have the same structure as that of the spindle motor shown in FIG. 4. The spindle motors 50 and 55 according to the present embodiment have a conductive structure as stated below to discharge electrostatic charge stored in the rotatable components including the rotor hub 3 to the fixed components. More particularly, in the spindle motor 50 shown in FIG. 5A, a blind hole 51 is formed on the top of the shaft 2, and a headed pin 52 whose head is composed of a conductive material having a roughly spherical contact point is inserted into the blind hole 51. The headed pin 52 is inserted into the blind hole 51 with having a specific clearance against the bottom section 51a of the blind hole 51 in a manner movable in response to the movement of the rotor hub 3 during its rotation. The headed pin 52 is pushed upward by a coil spring 53 made from a conductive material so that the head of the headed pin 52 comes into contact with the rotational center positioned inside of the upper face of the rotor hub 3. One end of the coil spring 53 is in contact with the underhead of the headed pin 52 while the other end is in contact with a back facing hole 54 formed on the top of the shaft 2 for centering the headed pin 52.

The above structure makes it possible to discharge electrostatic charge stored in the rotor hub 3 through the headed pin 52 and the coil spring 53 into the shaft 2 whether the spindle motor 50 is rotating or not. The spring constant of the coil spring 53 may be set at low level for assisting lift up of the lower face 5a of the rotatable radial bearing component 5 from the thrust plate 6 (see FIG. 4). If the spring constant of the coil spring 53 is set at the level of installation load equal to the total load of all the rotatable components, the spring may keep the lower face 5a of the radial bearing component 5 and the thrust plate 6 in non-contact state even when the spindle motor stops. This enables avoidance of the torque loss due to the frictional resistance between the radial bearing component 5 and the thrust plate 6 when starting rotation.

In the spindle motor 55 shown in FIG. 5B, the structure of the hydrodynamic gas bearing and the main body of the spindle motor is the same as that illustrated in FIG. 5A. A blind hole 56 is made on the top of the shaft 2, and a headed pin 57 and a coil spring 58 are inserted into the blind hole 56. The coil spring 58 is disposed between a bottom section 56a of the blind hole 56 and the lower face of the headed pin 57 to push the headed pin 57 upward. Static electric charge stored in the rotor hub 3 is discharged through the headed pin 57 which is fitted into the blind hole 56 in a slidable manner by having a slight clearance, and the coil spring 58 to the shaft 2.

In the electrostatic charge conductive structure according to this embodiment, a contact point of the conductive headed pins 52 and 57 is located on the rotational center of the rotor hub 3, so that there is no concern for torque loss, friction, and heat generation. In assembling the spindle motor 55, as the headed pins 52 and 57 are only in contact with the inside of the rotor hub 3, there is also no concern for causing the displacement of rotational center between rotatable components and the fixed components. Setting the installation load of the springs 53 and 58 equal to the total load of all the rotatable components, the spring 53 and 58 may remove the torque loss due to the frictional resistance in the thrust bearing section when stating rotation. Although the conductive structure including the headed pins 52 and 57 is attached to the shaft 2 included in the fixed components in the embodiment shown in FIG. 5, it will be understood that the conductive structure may be attached to the rotatable rotor hub 3. Also, a bearing may be configured in which the shaft 2 having the conductive structure as illustrated in the drawing is a rotatable component.

Figure 6:
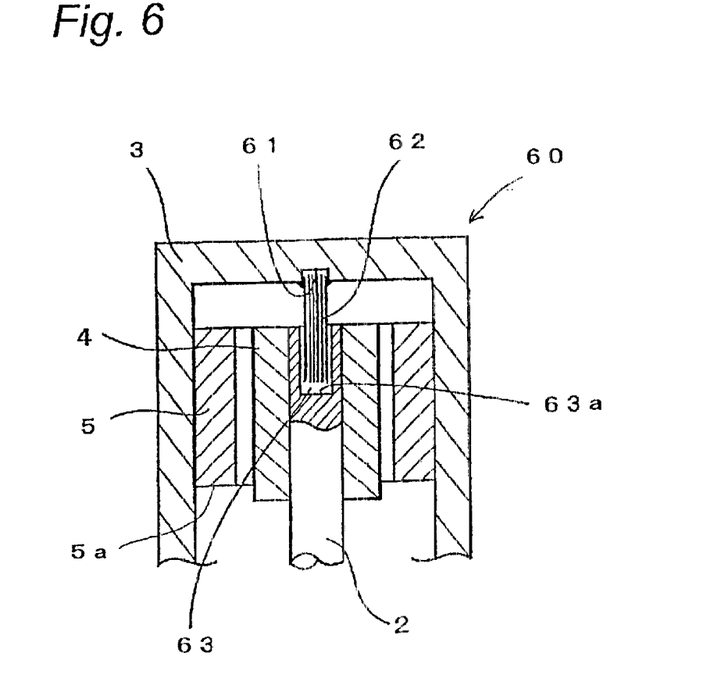
FIG. 6 is a fragmentary cross sectional view showing a bearing structure of still another embodiment of the present invention.

Now the sixth embodiment of the spindle motor according to the present invention will be described with reference to the associated drawing. FIG. 6 illustrates a portion of the electrostatic charge conductive section indicated by X in FIG. 4 in the spindle motor 60 according to this embodiment. The spindle motor 60 according to the present embodiment has a conductive structure as stated below to discharge electrostatic charge stored in the rotatable components including the rotor hub 3 to the fixed components. Namely, a back facing hole 61 is formed on the upper surface inside of the rotational center of rotor hub 3. Conductive fibers 62 is bundled and fixed to the back facing hole 61 by using, for example, an anaerobic adhesive agent which is cured by ultraviolet rays. The free end opposed to the fixed end of the fibers 62 is fitted into a blind hole 63 in a way that the free end faces a bottom section 63a of the blind hole 63 with specific spacing. The bundled conductive fibers 62 are preferably made of boron, carbon monofilaments, or tungsten.

Setting the outside diameter of the bundled fibers 62 smaller than the inside diameter of the blind hole 63 keeps the bundled fibers 62 out of contact with the inside periphery of the blind hole 63 even if, for example, the lower face 5a of the rotatable radial bearing component 5 is seated on the thrust plate 6 (sec FIG. 4) in the thrust bearing section when the spindle motor 60 stops. In addition, the free end of the fibers 62 is also not in contact with the bottom 63a of the blind hole 63. This prevents increase of power consumption due to resistance generated against driving torque at the time of restart, as well as disturbance against the rotor hub 3 from lifting up by the effect of the hydrodynamic pressure generating groove 7 (see FIG. 4) in the thrust bearing section.

In assembling the spindle motor 60, setting the outside diameter of the bundled fibers 62 smaller than the inside diameter of the blind hole 63 prevents displacement of rotational center between the rotatable components and the fixed components. If the free end of the bundled fibers 62 should come into contact with the inside periphery of the blind hole 63, the fibers 62 are flexible enough to prevent abrasion or generation of unnecessary frictional heat at the contact point. If the free end of the bundled fibers 62 stays in contact with the inside diameter of the blind hole 63 even when rotation stops, electrostatic charge stored in the rotatable components including the rotor hub 3 can be discharged through the fibers 62 to the shaft 2 side whether the spindle motor 60 is rotating or not.

Since the rotational speed of a spindle motor used in HDD is generally 12,000 rpm. to 18,000 rpm., the free end of the conductive fibers 62 is, during rotation of the rotor hub 3, outspread like an umbrella by centrifugal force and stays in light contact with the inside periphery of the blind hole 63, which discharges electrostatic charge stored in the rotatable components to the shaft 2. The fibers 62 in each case stated above are excellent in heat resistance and abrasion resistance, and the melting point thereof is 2,300° C. or more. Accordingly, if the free end of the fibers 62 are in contact with the inside periphery of the blind hole 63, the fibers 62 are capable of sufficiently enduring friction or heat caused by high-speed rotation. As stated above, the conductive structure including the bundled fibers 62 according to the present embodiment is required to be fixed to the rotatable components. Accordingly in the case of a bearing structure in which the shaft 2 is a rotatable component, the bundled fibers 62 is, different from FIG. 6, to be fixed to the shaft 2 and the free end thereof is to be inserted in a hole formed on a fixed component.

Figure 7:
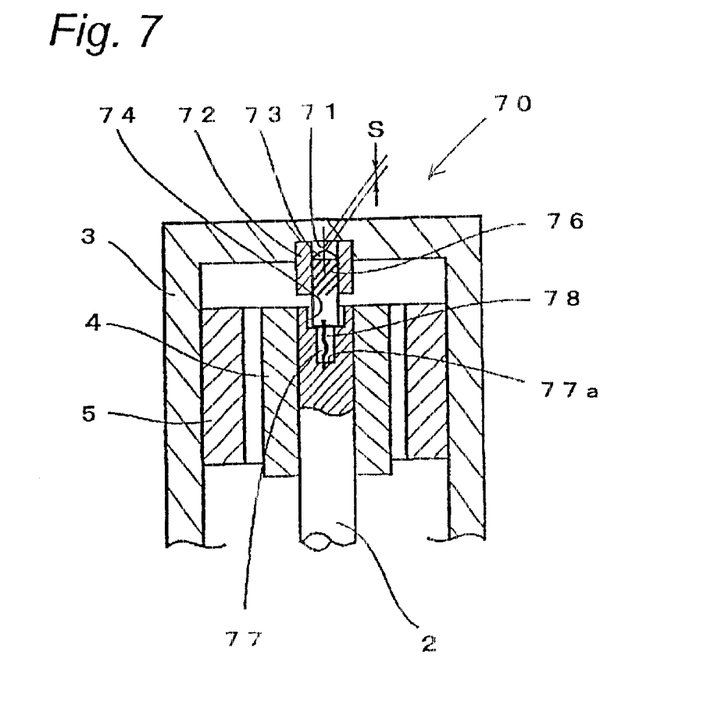
FIG. 7 is a fragmentary cross sectional view showing a bearing structure of still another embodiment of the present invention.

Now the seventh embodiment of the spindle motor according to the present invention will be described with reference to the associated drawing. FIG. 7 illustrates a vicinity of the electrostatic charge conductive section indicated with X in FIG. 4 for the spindle motor 70 according to this embodiment. The spindle motor 70 according to the present embodiment has a conductive structure as stated below to discharge electrostatic charge stored in the rotatable components including the rotor hub 3 to the fixed components. Namely, in the inner surface of the upper end of the rotor hub 3, there is formed a back facing hole 71 at the rotational center, to which a sleeve 72 is fixed. Inside the hollow of the sleeve 72, a spindle 73 having a spherical-shaped contact point in one end thereof, which is located at the upper end in the drawing, is inserted in a rotatable manner. The spindle 73 is guided by the sleeve 72 and brought into contact with a stopper section 74 provided on the upper end of the shaft 2. On the outer peripheral surface of the spindle 73 at the portion guided by the sleeve 72 is given a groove or grooves 76 for generating hydrodynamic pressure, which generates thrust force pushing the spindle 73 upward in an axial direction. From a bottom section 77a of a blind hole 77 forming the stopper section 74, there extends a strand 78 composed of conductive fibers. The other end of the strand 78 is fixed to an end opposed to the contact point of the spindle 73. This gives the strand 78 a specific allowance (sagging) in fixing the spindle 73. The strand 78 composed of conductive fibers is preferably made of boron, carbon monofilaments, tungsten, etc.

The above structure makes it possible to discharge electrostatic charge stored in the rotatable components including the rotor hub 3 through the spindle 73 and the strand 78 to the shaft 2 whether the spindle motor 70 is rotating or not. When the spindle motor 70 stops, the spindle 73 is guided to the hollow region of the sleeve 72 and seated on the stopper section 74 due to its own weight with the strand 78 in sagging condition. Consequently, electrostatic charge stored in the rotatable components can be discharged through the spindle 73 guided to the sleeve 72 and the strand 78, or through the contact region of the seated step section 74, into the shaft 2.

When the rotation of the spindle motor 70 is initiated and the rotor hub 3 rotates at high-speed, thrust force generated by the effect of the groove or grooves 76 engraved on the outer peripheral surface of the spindle 73 for generating hydrodynamic pressure raises the spindle 73 from the stopper section 74 on which the spindle 73 was seated, by a distance S shown in the drawing within the range of sagging given to the strand 78 inside the sleeve 72, which brings the contact point of the spindle 73 into contact with the rotor hub 3. At this point, the rotating torque of the spindle 73 is absorbed by the strand 78. The contact between the spindle 73 and the rotor hub 3 results in conducting electrostatic charge stored in the rotatable components including the rotor hub 3 to the spindle 73, from which the electrostatic charge is discharged through the strand 78 to the shaft 2.

In the conductive structure of the spindle motor 70 according to this embodiment, the contact point on the edge of the conductive spindle 73 is located at almost the rotational center of the rotor hub 3. Accordingly, there is no concern for torque loss, friction, and heat generation. In assembling the spindle motor 70, by setting a gap between the outside diameter of the spindle 73 and the inside diameter of the step section 74 larger than a gap between the fixed radial bearing component 4 and the rotatable radial bearing component 5 at the radial bearing section, the displacement of rotational center between the rotatable components and the fixed components is prevented. Lifting up of the rotor hub 3 with the effect of the hydrodynamic pressure generating groove 7 (see FIG. 4) in the thrust bearing section is not disturbed as well.

The spindle motor and the bearing structure in each embodiment of the present invention has been described so far by taking a hydrodynamic gas bearing as a common example. It will be understood, however, that the invention is not limited to those embodiments disclosed, but is applicable to other bearing structures featuring non-contact rotation such as a magnetic bearing structure which supports a bearing section with the effect of a magnet, or a hydrostatic gas bearing which supports a bearing section with compressed air. In these bearing structures, using a magnetic fluid or other mechanical conductive structures in a location free from air flow and substantially free from relative rotation (a region on a rotational axis or a vicinity thereof) makes it possible to discharge electrostatic charge, and/or use of bearing components made of conductive ceramics makes it possible to discharge electrostatic charge when the spindle motor stops. Accordingly, not only the hydrodynamic gas bearing, but also other type of bearings having structures enabling non-contact rotation will fall within a scope of the present invention.

Further, the spindle motor in each foregoing embodiment has also been described by assuming the application to the HDD. It should be understood, however, that the invention is not limited to those embodiments disclosed, but is usable for other applications, for example, for driving a polygon mirror used in a barcode reader.

Figure 8:
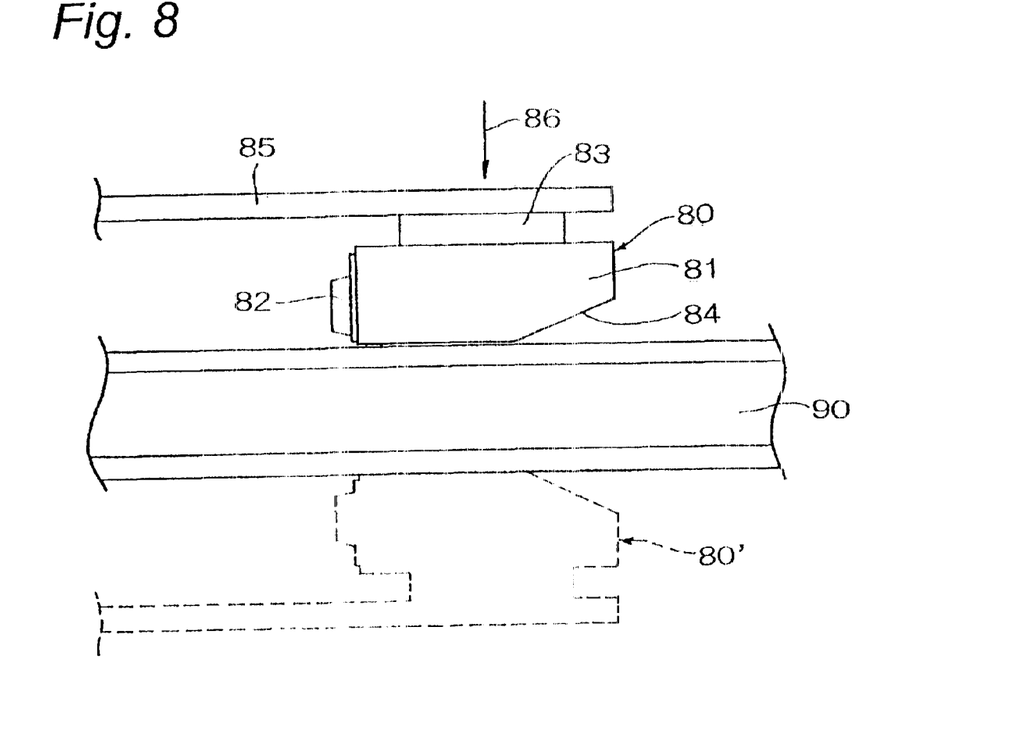
FIG. 8 is a fragmentary side view showing a head section of an HDD.

Next, the eighth embodiment of the present invention will be described with reference to the associated drawings. This embodiment relates to a structure of the HDD, in which electrostatic charge generated in the rotatable components of the spindle motor is discharged not by the spindle motor itself, but by using the HDD structure as a whole. Before describing the HDD according to the present embodiment, the relationship between storage media and head assemblies both of which execute record and replay of the storage media will be described first. FIG. 8 is an enlarged fragmentary view showing a combination of one head assembly 121 and one storage medium 90 extracted from the HOD components described in the prior art by referring to the FIG. 10. The drawing is viewed from a direction parallel to the rotation surface of the storage media 90. In FIG. 8, the storage medium 90 and the spindle motor are in quiescent condition in which a head assembly 80 is brought into contact with the surface of the storage medium 90 by the pressure given by a carriage 85 in a direction indicated with an arrow 86.

The head assembly 80 is composed of a slider 81 which is in contact with the storage medium 90, a head core 82 fixed to the slider 81 which performs record and replay of information on and from the surface of the storage medium 90, and a micro positioner 83 which conducts fine adjustment of a position of the slider 81. Each of these components is attached to a gimbal (not illustrated) provided on the edge of the carriage 85 for keeping them at horizontal position.

The slider 81 is in the shape of an approximate hexahedron. One surface of the slider 81 that stays in contact with the storage medium 90 has a slope section 84 in a direction parting from the contact face with the storage medium 90. Illustrated with a dotted line is another head assembly 80' which stays in contact with the surface of the storage medium 90 opposite to the surface with which the head assembly 80 is in contact. The storage medium 90 typically has two information storage surfaces on both sides, and record and replay on these surfaces is each performed by the head assemblies 80 and 80' disposed in each side.

Figure 9:
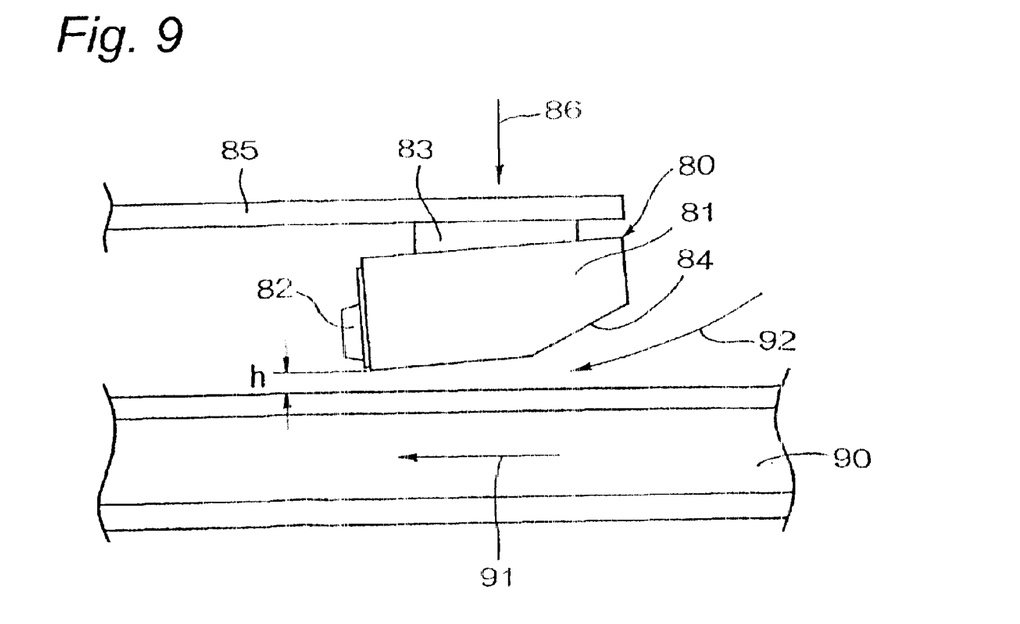
FIG. 9 is a fragmentary side view showing the head section illustrated in FIG. 1 in the operation condition.

FIG. 9 indicates an operation condition in the above-stated structure of the storage medium 90 and head assembly 80, in which the spindle motor having the storage medium 90 rotates at a high-speed and record and replay of information are performed between the storage medium 90 and head assembly 80. As the spindle motor rotates, the storage medium 90 displaces at a high-speed in a direction indicated with an arrow 91. At this point, a gas (the air if operated in the air) present in the vicinity of the surface of the storage medium 90 is convoluted by its own viscosity in between the slope section 84 of the slider 81 and the storage medium 90 as shown with an arrow 92. With the effect of hydrodynamic pressure generated with the wedge effect of this fluid convolution, the slider 81 floats against the slider pressure 86, which brings the storage medium 90 into non-contact condition with the head assembly 80. In this non-contact condition, the head assembly 80 performs record or reply of information on or from the information storage surface of the storage medium 90 by means of the head core 82.

The floating amount h of the slider 81 from the storage medium 90 shown in FIG. 9 is currently approximately from 30 nm to 60 nm. With recent increase in density of storage media, the floating amount tends to be smaller. Compared to a gap in the hydrodynamic bearing used in the spindle motor which is about several $\mu m$ at the smallest, the floating amount h is extremely small. Accordingly, if electrostatic charge is stored in the rotatable components of the spindle motor stated above, the electrostatic charge is much more likely to be discharged between the slider 81 and the storage medium 90 rather than to be discharged between the spindle motor bearing components. If the electrostatic charge should be discharged between the slider 81 and the storage medium 90, the head assembly 80 or the storage medium 90 can be destructed. In FIG. 9, the head assembly 80' to be disposed on the opposite side (the lower side of the drawing) to the storage media 90 is not shown.

In the HDD according to the present embodiment, there is provided a combination of specified head assembly (hereinafter referred to as a "dummy head") and a specified storage medium (hereinafter referred to as a "dummy disk") having higher possibility of occurring discharge in comparison with the other combinations of head assemblies 80 and the storage media 90, in order to discharge the electrostatic charge at this specified combination intentionally. If electrostatic charge is stored in the rotatable components of the spindle motor, discharge of this electrostatic charge is induced between the dummy head and the dummy disk to prevent discharge thereof in other regular head sections and protect the entire HDD.

Typically, several to sometimes 10 or more storage media 90 are mounted on the outer peripheral surface of a spindle motor used in the HDD as outlined in FIG. 11. In this embodiment, one of these storage media is used as a dummy disk. Specified conditions susceptible to occur discharge between the dummy disk and a dummy head faced with the dummy disk are to be arranged. One of the specified conditions is to make the floating amount of the dummy head from the dummy disk extremely smaller than the floating amount of other regular head assemblies. This measure can be easily implemented by making the slider pressure 86 pressing the dummy head to the dummy disk larger than the slider pressure 86 for the other head sections. For example, the floating amount h of the dummy head is arranged to be a half of the floating amount of other regular head assemblies. More particularly, the floating amount h of the dummy head from the dummy disk is arranged to be 15 nm or less.

Another condition for making intentional discharge between the dummy head and the dummy disk is to make at least the surface of the dummy head and the dummy disk made from a material having better conductivity compared to the material used for other regular head assembly 80 and storage media 90. For example, if the surface of the regular media 90 is made of an aluminum evaporated layer, the surface of the dummy disk is to be made of a copper evaporated layer. If the regular slider 81 is made of stainless steel, the dummy head is to be made of silver plated stainless steel. If the regular carriage 85 is made of stainless steel, the carriage 85 supporting the dummy head is to be made of copper. These are a part of examples of possible material substitution. It is also possible to induce discharge in a path formed by the dummy disk/dummy head by making overall electrical resistance of the dummy disk/dummy head combination lower than the electrical resistance of other regular sections. It will be appreciated that this embodiment includes a method for avoiding electrostatic charge problem in other sections consisting the HDD by inducing electrostatic charge generated in the HDD to be discharge in between the dummy disk and the dummy head.

The embodiments of the HDD having a electrostatic charge countermeasure according to the present invention have been described in the forgoing detailed description. It will be understood that, although the application of these embodiment is especially effective when they are applied to the HDD having a hydrodynamic gas bearing in which electrostatic charge is stored in the rotatable components, application of these embodiments are not limited to it. Even in the case a ball bearing is used, if a component equipped with the ball bearing is made of a non-conductive material or a material with high electric resistance, sufficient discharge of electrostatic charge through the ball bearing may not be assured, and discharge in the head assembly section may occur. The present invention is applicable to such cases for avoiding damages on the HDD equipment due to discharge.

We claim:

1. A bearing structure having a hydrodynamic gas bearing, comprising:

fixed components; and rotatable components which are supported by the fixed components for rotation, wherein the fixed components and the rotatable components are kept in a non-contact state during rotation of the rotatable components by means of hydrodynamic gas pressure generated at both a radial bearing portion and a thrust bearing portion, the bearing structure further comprising a conductive structure having a magnetic fluid for electrically connecting the fixed components and the rotatable components either in the region where there is no gas flow generated by suction or discharge of a gas for generating hydrodynamic pressure at the hydrodynamic gas bearing portion, or in the region where the gas flow is negligible.

2. A spindle motor having the bearing structure according to claim 1.

3. A hard disk drive having the spindle motor according to claim 2.

* * * * *